United States Patent
Suzuki et al.

(10) Patent No.: US 12,499,906 B1
(45) Date of Patent: Dec. 16, 2025

(54) MAGNETIC DISK DRIVE AND CONTROL METHOD OF THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Sho Suzuki, Hachioji Tokyo (JP); Daisuke Sudo, Kawasaki Kanagawa (JP); Takeyori Hara, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/983,903

(22) Filed: Dec. 17, 2024

(30) Foreign Application Priority Data

Jun. 14, 2024 (JP) .................................. 2024-096646

(51) Int. Cl.
  *G11B 5/55* (2006.01)
  *G11B 21/02* (2006.01)

(52) U.S. Cl.
  CPC ............ *G11B 5/5547* (2013.01); *G11B 21/02* (2013.01)

(58) Field of Classification Search
  None
  See application file for complete search history.

(56) References Cited

U.S. PATENT DOCUMENTS

| | | | |
|---|---|---|---|
| 5,844,396 A * | 12/1998 | Iwabuchi | G11B 5/54 318/434 |
| 6,781,787 B1 | 8/2004 | Codilian et al. | |
| 6,795,268 B1 | 9/2004 | Ryan | |
| 6,826,007 B1 * | 11/2004 | Patton, III | G11B 5/5526 |
| 6,909,575 B2 | 6/2005 | Soyama et al. | |
| 7,042,673 B2 | 5/2006 | Jeong | |
| 8,941,939 B1 * | 1/2015 | Rigney | G11B 5/59661 360/78.01 |
| 8,988,811 B1 * | 3/2015 | Ding | G11B 5/5547 360/78.04 |
| 9,947,352 B1 | 4/2018 | Sudo et al. | |
| 10,008,227 B1 | 6/2018 | Sudo et al. | |
| 2002/0027740 A1 * | 3/2002 | Inaji | G11B 5/5526 |
| 2009/0128946 A1 * | 5/2009 | Ooi | H02P 6/182 318/494 |

* cited by examiner

*Primary Examiner* — Peter Vincent Agustin
(74) *Attorney, Agent, or Firm* — Knobbe, Martens, Olson & Bear, LLP

(57) ABSTRACT

According to one embodiment, a magnetic disk drive comprising, a magnetic disk, a magnetic head, a voice coil motor, and a controller. The controller includes a seek control section, a velocity calculation section, a back electromotive voltage estimation section, and a coil resistance estimation section.

10 Claims, 8 Drawing Sheets

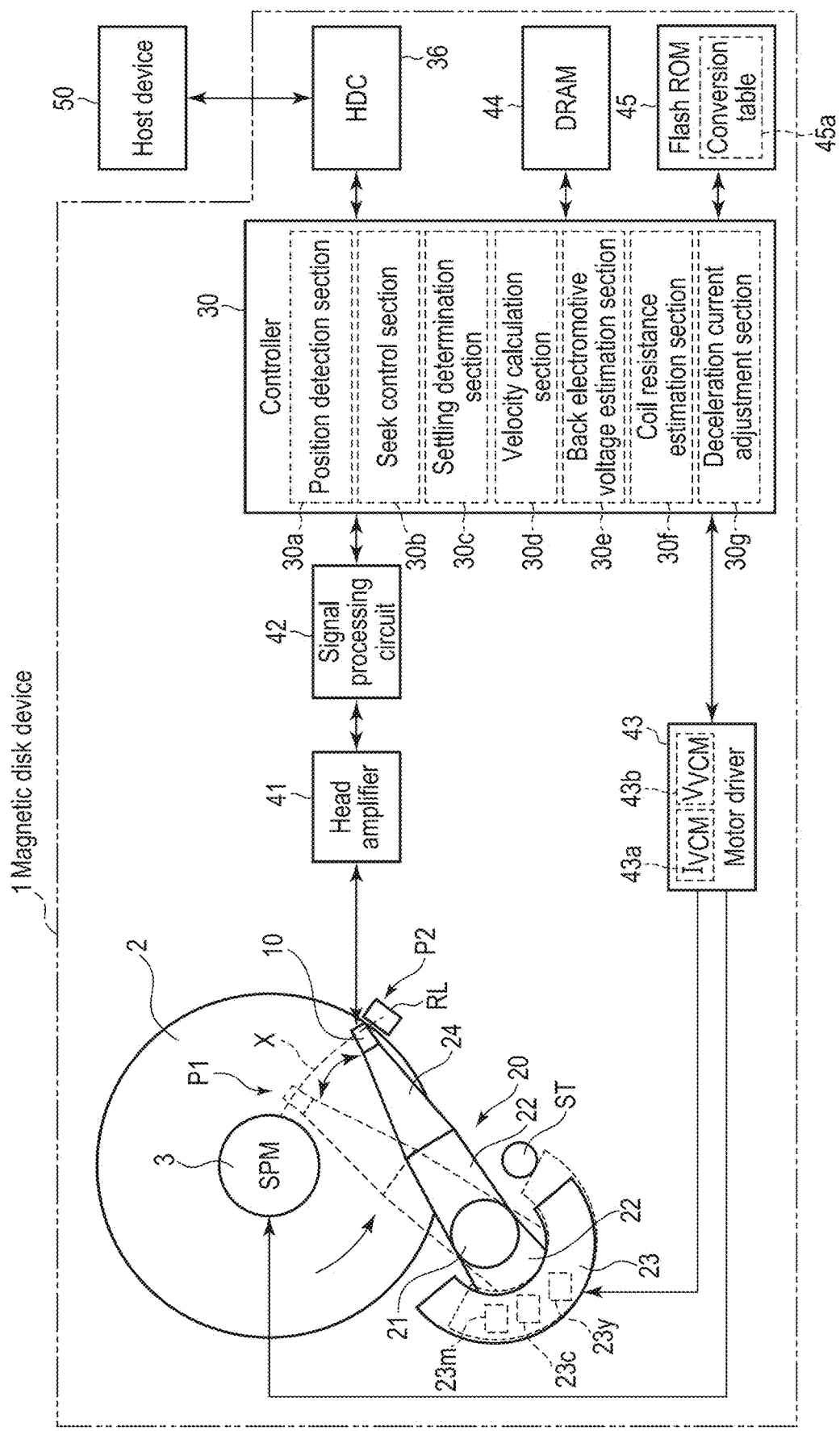
F I G. 1

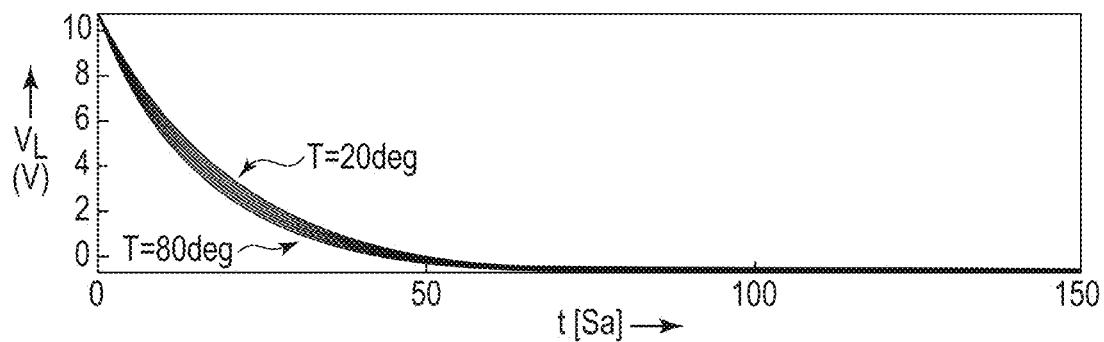
F I G. 6
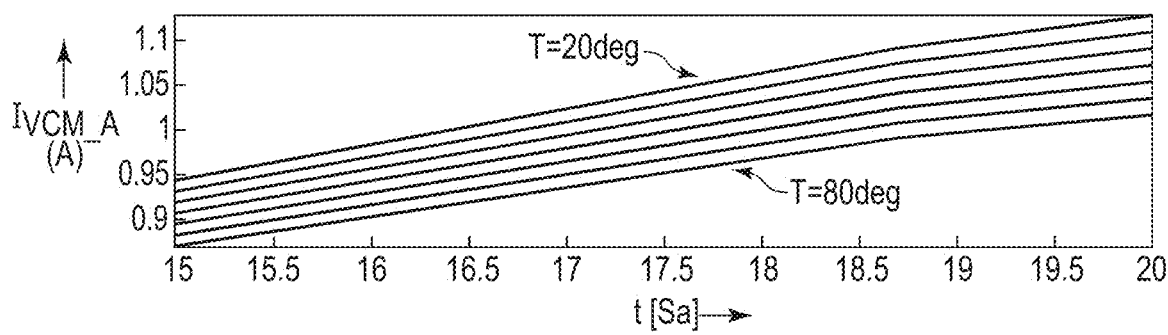
F I G. 7
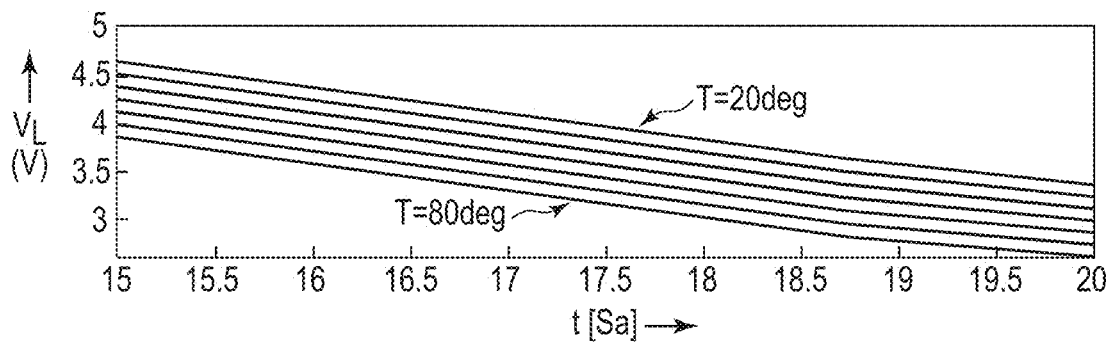
F I G. 8

| Conversion table | |
|---|---|
| $I_{VCM\_A}$ | $V_L$ |
| I1 | V1 |
| I2 | V2 |
| I3 | V3 |
| ⋮ | ⋮ |
| In | Vn |

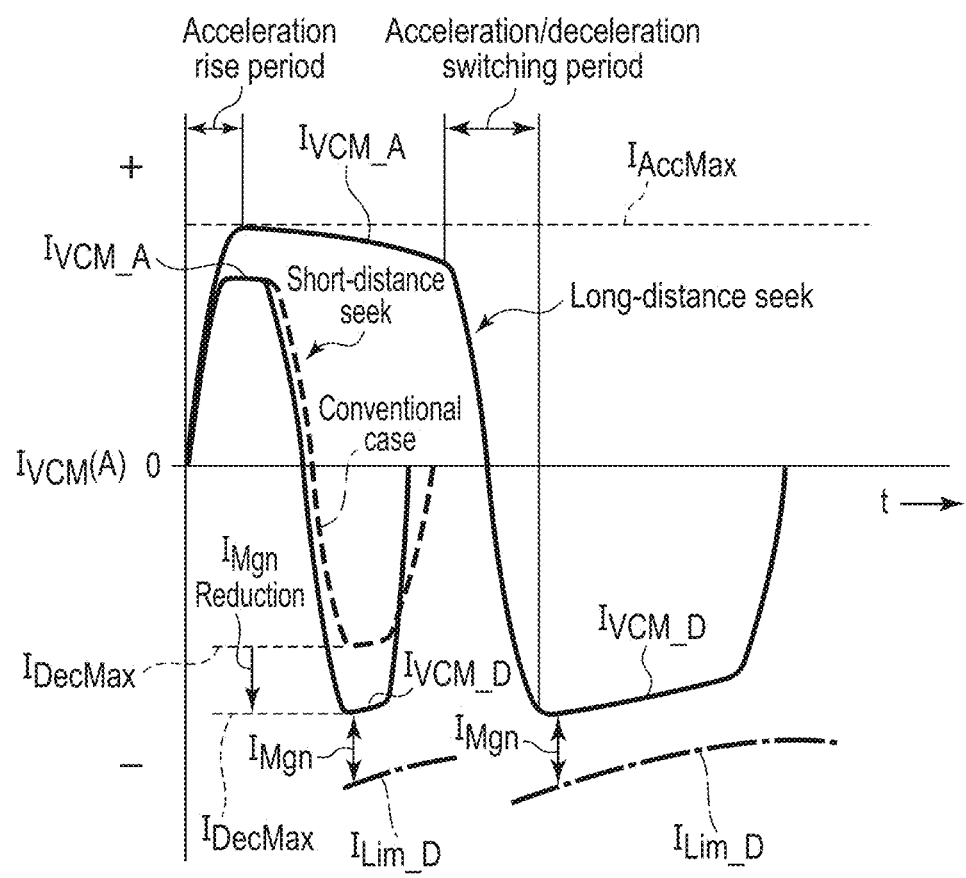
F I G. 13

MAGNETIC DISK DRIVE AND CONTROL METHOD OF THE SAME

CROSS-REFERENCE TO RELATED APPLICATIONS

This application is based upon and claims the benefit of priority from Japanese Patent Application No. 2024-096646, filed Jun. 14, 2024, the entire contents of which are incorporated herein by reference.

FIELD

Embodiments described herein relate generally to a magnetic disk drive comprising a magnetic disk and a magnetic head, and a method of controlling the magnetic disk drive.

BACKGROUND

A magnetic disk drive comprising a magnetic disk and a magnetic head includes an actuator which holds the magnetic head so as to move in the radial direction of the magnetic disk and, when writing and reading data to and from the magnetic disk, moves the magnetic head from the current position to a target position (write position or read position) on the magnetic disk in the radial direction of the magnetic disk. Refer to this movement as seek operation, or simply referred to as seek.

In order to improve seek performance (enhancing the access performance), it is important to maximize the potential of the voice coil motor (VCM). One of the measures to maximize the potential of voice coil motors is the saturated acceleration function. The saturated acceleration function increases the drive current of the voice coil motor (, which is referred to as a drive current for acceleration) during seek acceleration until it reaches saturation, thereby maximizing the acceleration of the seek.

However, during deceleration of the seek, the drive current of the voice coil motor (drive current for deceleration) cannot be increased to saturation due to the need to ensure that the magnetic head stops at the target position. In order to increase the deceleration of the seek as much as possible within the range where the deceleration drive current does not saturate, it is necessary to know the resistance value of the voice coil motor, which is the limiting factor of the fluctuation of the drive current for deceleration, so that the drive current for deceleration does not saturate.

The main cause of the fluctuation of the limit value of the drive current for deceleration is the coil resistance of the voice coil motor. Here, by estimating the coil resistance, the drive current for deceleration can be varied according to the limit value of the drive current for deceleration, and the optimal drive current for deceleration can always be supplied to the voice coil motor to improve the performance of the seek access.

BRIEF DESCRIPTION OF THE DRAWINGS

FIG. 1 is a diagram showing an overall configuration of one embodiment.

FIG. 6 is a diagram showing a change in inductance voltage generated in the inductance component shown in FIG. 3 along with the coil temperature of the voice coil motor as a parameter.

FIG. 7 is a diagram showing a part of the change in the drive current for acceleration shown in FIG. 5 while expanding its time axis.

FIG. 8 is a diagram showing a part of the change in inductance voltage shown in FIG. 6 while expanding its time axis.

FIG. 13 is a diagram illustrating how the drive current for deceleration of the voice coil motor increases during a short-distance seek in one embodiment as compared to that of the conventional case.

DETAILED DESCRIPTION

Figure 2:
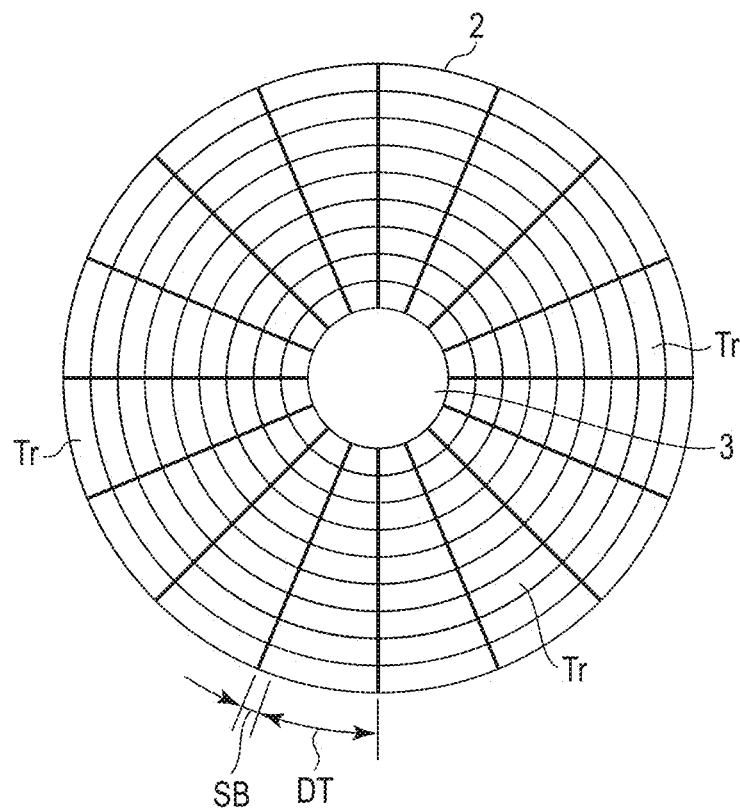
FIG. 2 is a diagram showing a configuration of main portions of the magnetic disk in one embodiment.

In general, according to one embodiment, a magnetic disk device comprises a magnetic disk, a magnetic head which performs write and read of data to and from the magnetic disk, a voice coil motor including a magnet and a coil, which moves the magnetic head in a radial direction of the magnetic disk, and a controller which controls rotation of the magnetic disk and the movement of the magnetic head, and the controller includes a seek control section which controls a drive current of the voice coil motor to execute a seek operation by moving the magnetic head from a current position to a target position on the magnetic disk, in a manner including acceleration and deceleration, a velocity calculation section which calculates a velocity of the magnetic head during the seek operation, a back electromotive voltage estimation section which estimates a back electromotive voltage induced in the coil of the voice coil motor based on the velocity calculated in the velocity calculation section and the position of the magnetic head during acceleration of the seek operation, and a coil resistance estimation section which obtains an inductance voltage induced in a inductance component of the coil of the voice coil motor during the acceleration of the seek operation and estimates a resistance of the coil of the voice coil motor based on the obtained inductance voltage, a drive voltage of the voice coil motor, the drive current of the voice coil motor, and the back electromotive voltage estimated by the back electromotive voltage estimation section.

One embodiment will now be described with reference to the drawings.

As shown in FIG. 1, a magnetic disk device 1 includes a magnetic disk 2 as a recording medium, a spindle motor 3 that drives to rotate this magnetic disk 2, and a magnetic head 10 that writes (records) and reads (reproduces) data to and from the magnetic disk 2. An actuator 20 that supports the magnetic head 10 is disposed in the vicinity of the magnetic disk 2.

The actuator 20 supports the magnetic head 10 so as to be able to seek it in the radial direction of the magnetic disk 2. The actuator 20 may as well be referred to as an actuator block or head stack assembly (HSA), and includes a rotary shaft 21, an arm 22 held by the rotary shaft 21 by its middle portion, a voice coil motor (VCM) 23 disposed at a proximal end portion of the arm 23, and a suspension member 24 disposed at a distal end portion of the arm 23 so as to hold the magnetic head 10 described above.

The above-described voice coil motor 23 includes a magnet 23m, a coil 23c, and a yoke 23y to which the magnet 23m is attached. With this configuration, the actuator 20 is pivoted between a first position (indicated in the figure by dashed line) and a second position (indicated by solid line) when a drive current IVCM flows through the coil 23c. With the pivotal movement of the actuator 20, the magnetic head 10 seeks (moves) in the radial direction of the magnetic disk 2 in the tracking X indicated in the figure. Refer to this movement as seek operation, or simply referred to as seek.

In the vicinity of the actuator 20, a stopper ST and a ramp mechanism RL are provided. The stopper ST limits the moving position of the actuator 20 within an inner circumferential side of the magnetic disk 12. The ramp mechanism RL evacuates the magnetic head 16 from the magnetic disk 2 when the spindle motor 3 is stopped.

The magnetic disk device 1 includes a controller 30 that serves as the center of control, a head amplifier 41 that drives the magnetic head 10, a signal processing circuit 42 provided in the connection between the head amplifier 41 and the controller 30, a motor driver 43 provided in the connection between the voice coil motor 23 and the controller 30, a DRAM 44, which is a memory that stores programs, etc., necessary for the control of the controller 30, a flash ROM 45, which is a memory that stores various data necessary for the control of the controller 30, a hard disk controller (HDC) provided in the connection between the controller 30, the hard disk controller (HDC) and an external host device 50, and the like.

The above-described head amplifier 41 amplifies data signals for writes from the signal processing circuit 42 to the magnetic head 10 and also amplifies data signals to be read by the magnetic head 10. The above-described signal processing circuit 42 appropriately processes data signals for writes from the controller 30 to the magnetic head 10 and supplies these to the head amplifier 41, and also processes read data signals amplified by the head amplifier 41 and supplies these to the controller 30.

The above-described motor driver 43 controls the drive current of the spindle motor 3 and the drive current $I_{VCM}$ of the voice coil motor 23 in reply to instructions from the controller 30. Further, the motor driver 43 includes a current detector 43a that detects the actual value of the drive current $I_{VCM}$ of the voice motor 23 (, which includes the drive current $I_{VCM\_A}$ for acceleration and the drive current $I_{VCM\_D}$ for deceleration) and a voltage detector 43b that detects the value of the drive voltage $V_{VCM}$ of the voice coil motor 23. The above-described flash ROM 45 contains a conversion table 45a used in the processing of a deceleration current adjustment section 30g of the controller 30, which will be described later. The contents of the conversion table 45a will be described later.

As shown in FIG. 2, the magnetic disk 2 has a circular shape coaxially fit to the rotational axis of the spindle motor 3 and has a number of tracks Tr aligned in a circumferential direction and a concentrical manner. Each of the tracks Tr contains a servo sector constituted by a servo pattern SB in which position data is recorded and a data area DT in which write data is stored.

The controller 30 includes a position detection section 30a, a seek control section 30b, a settling determination section 30c, a velocity calculation section 30d, a back electromotive voltage estimation section 30e, a coil resistance estimation section 30f, and a deceleration current adjustment section 30g as major functions.

[Position Detection Section 30a]

The position detection section 30a detects the position Pos of the magnetic head 10 on the magnetic disk 2 based on the position data of the servo pattern SB contained in the read data of the magnetic head 10.

[Seek Control Section 30b]

The seek control section 30b controls the drive of the voice coil motor 23 to seek the magnetic head 10 from the current position on the magnetic disk 2 to the target position Pt. More specifically, the seek control section 30b controls the drive current $I_{VCM}$ of the voice coil motor 23 of the actuator 20 based on the detection position Pos of the position detection section 30a to seek the magnetic head 10 from the current position on the magnetic disk 2 to the target position Pt while including acceleration and deceleration in sequence.

[Settling Determination Section 30c]

The settling determination section 30c executes the so-called settling determination, which determines that the magnetic head 10 has reached the target position Pt when a certain period of time Cs has elapsed while the capture position Pos of the position detection section 30a is being contained within the specified range in which the target position Pt is interposed therebetween during the seek of the magnetic head 10.

[Velocity Calculation Section 30d]

The velocity calculation section 30d calculates the velocity (movement velocity) $V_{hd}$ of the magnetic head 10 by an operation based on the history of the detection position Pos of the position detection section 30a (history of position of the magnetic head 10) when the seek of the magnetic head 10 is accelerated. More specifically, the velocity calculation section 30d performs a differential calculation on the detection position Pos of the position detection section 30a and obtains the absolute value of the calculation result as the seek velocity $V_{hd}$.

[Back Electromotive Voltage Estimation Section 30e]

The back electromotive voltage estimation section 30e estimates the back electromotive voltage $V_{BEMF}$ induced in the coil of the voice coil motor 23 during the acceleration of the seek of the magnetic head 10 by an operation based on the velocity $V_{hd}$ detected in the velocity detection section 30d and the position of the seek of the magnetic head 10 (the detection position Pos of the position detection section 30a). More specifically, the back electromotive voltage estimation section 30e estimates the back electromotive voltage $V_{BEMF}$ induced in the coil of the voice coil motor 23 by the product of the velocity $V_{hd}$ calculated by the velocity calculation section 30d and the BL factor $k_{BL}$ according to the detection position Pos of the position detection section 30a. The BL factor $k_{BL}$ is a coefficient determined by the product of the magnetic flux density of the magnetic field applied to the coil 23c from the magnet 23m of the voice coil motor 23 and the effective length of the winding of the coil 23c located in the magnetic field.

$$V_{BEMF} = V_{hd} \times k_{BL}$$

[Coil Resistance Estimation Section 30f]

The coil resistance estimation section 30f obtains the inductance voltage $V_L$ generated in the inductance component L of the coil 23c of the voice coil motor 23 during the acceleration of the seek of the magnetic head 10 based on the acceleration drive current $I_{VCM\_A}$ detected by the current detector 43a, and estimates the resistance (resistance value) R of the coil 23c of the voice coil motor 23 by the operation of the formula provided below based on the calculated inductance voltage $V_L$, the drive voltage $I_{VCM}$ of the voice coil motor 23 detected by the detector 43b, the back electromotive voltage $V_{BEMF}$ estimated by the back electromotive voltage estimation section 30e, and the acceleration drive current $I_{VCM\_A}$ detected by the current detector 43a. Note that the resistance R is referred to as a coil resistance R.

$$R=(|V_{VCM}|-|V_L|-|V_{BEMF}|)/|I_{VCM\_A}|$$

[Deceleration Current Adjustment Section 30g]

The deceleration current adjustment section 30g adjusts the maximum value $I_{DecMax}$ of the deceleration drive current $I_{VCM\_D}$ of the voice coil motor 23 during deceleration of the seek, by the operation of the formula provided below based on the coil resistance R estimated by the coil resistance estimation section 30f. The adjusted maximum deceleration drive current is referred to as called $I_{DecMaxM}$.

$$I_{DecMaxM}=I_{DecMax}\times(1/R)$$

<Explanation for Estimation of Coil Resistance>

Figure 3:
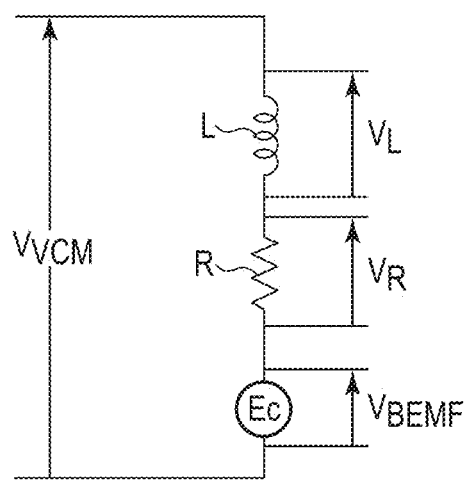
FIG. 3 is a diagram showing the equivalent circuit of a coil of a voice coil motor in one embodiment.

An equivalent circuit of the coil 23c of the voice coil motor 23 is shown in FIG. 3.

The coil 23c of the voice coil motor 23 has three elements, that is, the inductance component L, the resistance component (=resistance value) R, which is the coil resistance, and the back electromotive voltage Ec. $V_{VCM}$ is the drive voltage applied to the coil 23c. $V_L$ is the voltage generated in the inductance component as the drive voltage $V_{VCM}$ is applied. This voltage is referred to as an inductance voltage. $V_R$ is the voltage produced in the resistor R the drive voltage $V_{VCM}$ is applied. $V_{BEMF}$ is the back electromotive voltage induced in the coil 23c according to the movement of the magnet 23m in the seek of the magnetic head 10.

The coil resistance R varies with the temperature T of the coil 23c. The temperature T is hereinafter referred to as a coil temperature T. The back electromotive voltage back $V_{BEMF}$ varies with the velocity of the seek of the magnetic head 10 and the magnetic flux density of the magnetic field applied to the coil 23c from the magnet 23m of the voice coil motor 23. This magnetic flux density can vary due to changes in the relationship in position between the magnetic head 10 and the magnet 23m as the seek proceeds. The magnetic flux density is handled as a constant value for simplicity of explanation.

The relationship between the drive voltage $V_{VCM}$, the inductance voltage $V_L$, the voltage $V_R$ of the coil resistance R, and the back electromotive voltage $V_{BEMF}$ is expressed by the formula (1) provided below where the sampling time is represented by t and the drive current flowing in the coil 23c is represented by $I_{VCM}$.

$$V_{VCM}=V_L+V_R+V_{BEMF}=L(dI_{VCM}/dt)+RI_{VCM}+V_{BEMF} \quad (1)$$

In the formula (1), "L $(dI_{VCM}/dt)$" expresses that the response of the inductance voltage $V_L$ is transient when the drive voltage $V_{VCM}$ is applied to the coil 23c.

When the above-provided formula (1) is rearranged for the drive current $I_{VCM}$, the following formula (2) is obtained.

$$I_{VCM}=(V_{VCM}-V_L-V_{BEMF})/R \quad (2)$$

The drive current $I_{VCM}$ is the current determined from the physical elements of the inductance component L, the resistance component R, and the back electromotive voltage $V_{BEMF}$, and therefore it is the saturation current that flows when drive voltage $V_{VCM}$ is applied ($I_{VCM}=I_{Lim}$).

From the above-provided formula (2), it is clear that the limit value $I_{Lim}$ of the drive current $I_{VCM}$ is dependent on the coil resistance R.

In the magnetic disk device 1, the coil temperature T can always change due to the frequency of seek operations (that is, the frequency per time of commands received from the host device 50) and the temperature conditions of the magnetic disk device 1. As described above, the coil resistance R varies with the coil temperature T, and therefore, the limit value $I_{Lim}$ of the drive current $I_{VCM}$ can likewise always vary.

Figure 4:
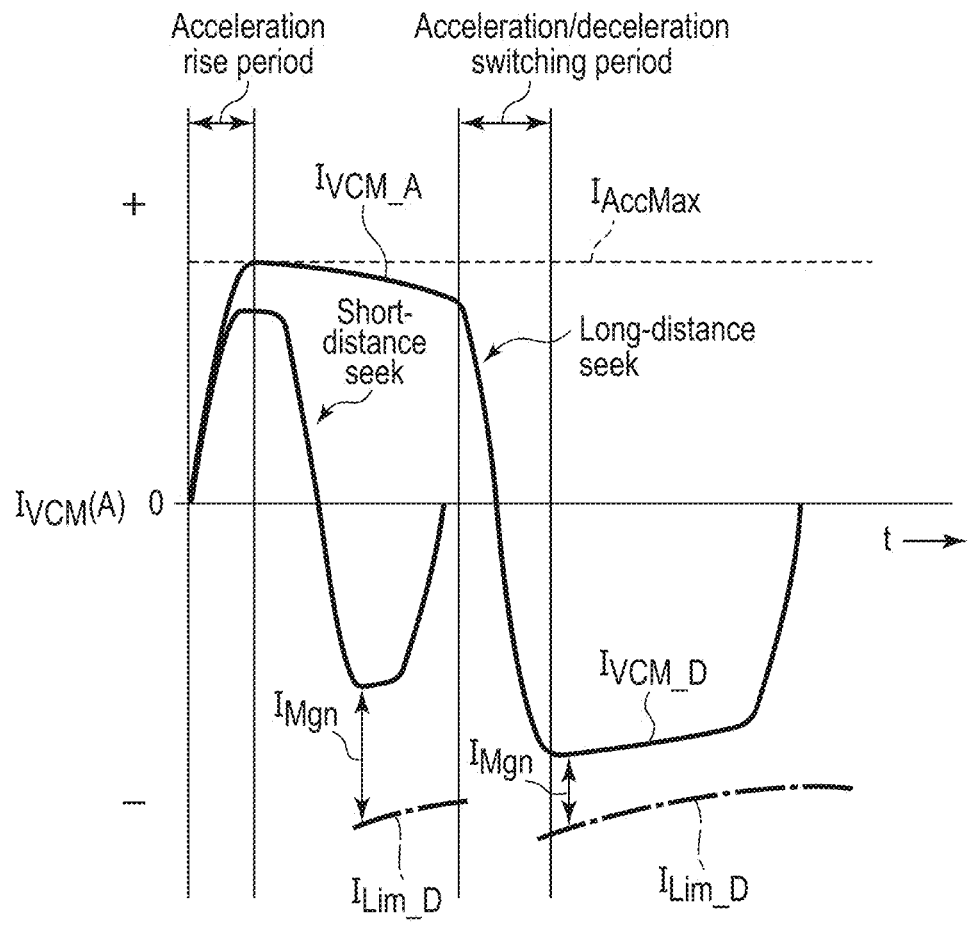
FIG. 4 is a diagram showing a change in drive current of a voice coil motor in one embodiment along with a distance of a seek as a parameter.

Changes in drive current $I_{VCM}$ due to the control of the seek control section 30b are illustrated in FIG. 4. Upon rise of the acceleration drive current $I_{VCM\_A}$, the seek of the magnetic head 10 is started and accelerated (acceleration rise period). Then, at a predetermined timing, the acceleration drive current $I_{VCM\_A}$ falls and the deceleration drive current $I_{VCM\_D}$ rises. Due to this operation, the actuator 20 to decelerate (acceleration/deceleration switch period). Thereafter, the deceleration drive current $I_{VCM\_D}$ falls (deceleration fall period), and the seek of the magnetic head 10 is finished through the determination of settling.

As mentioned above, in order to improve the seek performance (to achieve high performance), it is important to maximize the potential of the voice coil motor 23. One of the measures to maximize the potential of the voice coil motor 23 is the saturated acceleration function. The saturated acceleration function is a function that increases the acceleration of the seek to the maximum by controlling the acceleration drive current $I_{VCM\_A}$ to increase until saturation, that is, to achieve $I_{VCM\_A}=I_{Lim}$-A, during the acceleration of the seek.

On the other hand, during deceleration of the seek, in order to ensure that the magnetic head 10 stops at the target position, the target position and the current position are compared every predetermined time, and the deceleration drive current $I_{VCM\_D}$ is increased or decreased so that the difference between the target position and the current position becomes zero. Therefore, during deceleration, the deceleration drive current $I_{VCM\_D}$ cannot be increased until it saturates. In order to increase the deceleration of seek as much as possible, it is necessary to know the limit value $I_{Lim\_D}$ of the deceleration drive current $I_{VCM\_D}$, and carry out the control within the range where the deceleration drive current $I_{VCM\_D}$ does not saturate. In other words, it is necessary to adjust the deceleration drive current $I_{VCM\_D}$ to satisfy the condition: $I_{VCM\_D}<I_{Lim\_D}$. Here, note that the limit value $I_{Lim\_D}$ is dependent on the coil resistance R, the seeking control that does not exceed the limit value $I_{Lim\_D}$ of the deceleration drive current $I_{VCM\_D}$ can be carried out by obtaining the coil resistance R.

As shown in FIG. 4, when the seek distance is long (long-distance seek), the timing at which the acceleration drive current $I_{VCM\_A}$ saturates and reaches its maximum value $I_{AccMax}$ is the same as that at which the transient response of the inductance voltage $V_L$ converges and its inductance voltage $V_L$ becomes 0V. Therefore, it is possible to omit "L $(dI_{VCM}/dt)$" in the above-provided formula (1) and obtain the coil resistance (=resistance value) R as in the formula (3) provided below. Since there are two possible seek directions, that is, the inner circumferential direction and the outer circumferential direction of the magnetic disk 12, and the polarity of the applied voltage is different in each case, absolute values are introduced when transforming from the formula (1).

$$R=(|V_{VCM}|-|V_{BEMF}|)/|I_{AccMax}| \quad (3)$$

On the other hand, as also shown in FIG. 4, when the seek distance is short (short-distance seek), the seek switches to deceleration before the acceleration drive current $I_{VCM\_A}$ reaches the saturation point, that is, the maximum value $I_{AccMax}$. In this case, the transient response of the inductance voltage $V_L$ has not yet converged, that is, the inductance voltage $V_L$ is not 0 V, the coil resistance R cannot be obtained from the above-provided formula (3).

Under these circumstances, it is considered that the coil resistance R should be estimated in a stage previous to that the acceleration drive current $I_{VCM\_A}$ reaches the saturation point during the rise of the acceleration of seek.

In order to estimate the coil resistance R at a time before the acceleration drive current $I_{VCM\_A}$ reaches the saturation point, it is necessary to know the inductance voltage $V_L$ (not 0V) in the state where the transient response has not converged.

Here, it can be understood from the above-provided formula (1) that the inductance voltage $V_L$ at a time before the accelerating drive current $I_{VCM\_A}$ reaches the saturation point is $V_L=L\ (dI_{VCM\_A}/dt)$. That is, the inductance voltage $V_L$ at a time before the accelerating drive current $I_{VCM\_A}$ reaches the saturation point can be obtained by differentiating the acceleration drive current $I_{VCM\_A}$ detected by the current detector 43A.

Figure 5:
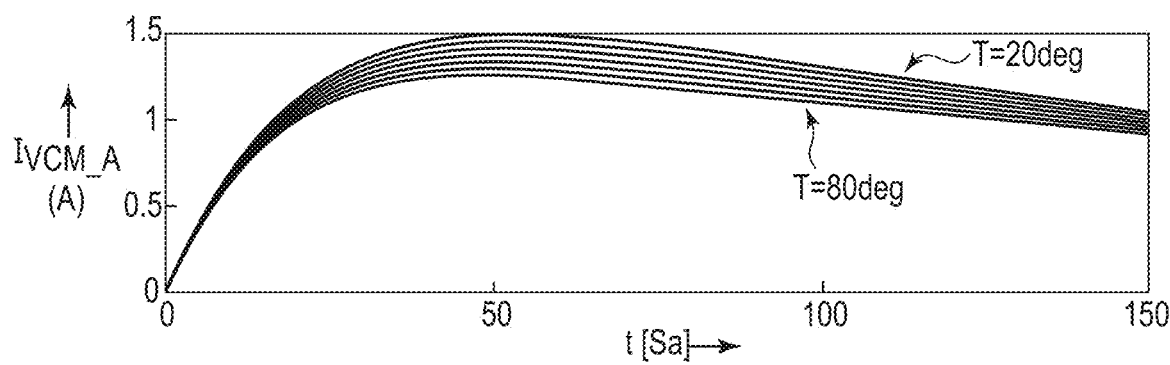
FIG. 5 is a diagram showing a change in drive current for acceleration of the voice coil motor in one embodiment with a coil temperature of the voice coil motor as a parameter.

Note here that there is a concern about differentiating the acceleration drive current $I_{VCM\_A}$ during the rise of the acceleration of seek. To explain, the acceleration drive current $I_{VCM\_A}$ during the rise of the acceleration of seek changes significantly per certain time, and therefore when it is assumed that the current detector 43a is an A/D converter with a limited quantization resolution, such as that installed in the motor driver 43, for example, there is no sufficient gradation to capture rapid changes in the acceleration drive current $I_{VCM\_A}$. As a result, a detection error (, which may as well be referred to as a measurement error) is likely to occur. Further, the detection error may be further emphasized by differential processing. As a means for reducing detection errors, averaging the detection results of multiple samples may be considered, but as shown in FIG. 5, the change in acceleration drive current $I_{VCM\_A}$ is not linear during the rise of the acceleration of seek. Therefore, it is difficult to obtain an accurate average value with arithmetic averaging, which requires a relatively small calculation load.

As a countermeasure, information on the correspondence between the acceleration drive current $I_{VCM\_A}$ detected by the current detector 43a and the inductance voltage $V_L$ is obtained in advance and maintained, and the correspondence information is referred to based on the detection results of the current detector 43a thereafter, thereby making it possible to estimate the inductance voltage $V_L$ at a timing before the acceleration drive current $I_{VCM\_A}$ reaches the saturation point while eliminating the increase in noise and averaging errors caused by differential processing.

FIG. 5 shows the change with time in the acceleration drive current $I_{VCM\_A}$ that flows when a constant drive voltage $V_L$ is applied to the voice coil motor 23, with reference to multiple coil temperatures T from 20° C. to 80° C. (, which can be rephrased as multiple coil resistances R) as parameters. In general control of a voice coil motor 23, such a function is employed that a pulse voltage is applied to the voice coil motor 23 using a pulse width nodulation (PWM) control or the like and the voltage level is adjusted by varying the pulse width of the applied voltage. But note here that the continuous application of a constant level of DC voltage without changing the pulse width is expressed as "applying a constant drive voltage $V_{VCM}$ to the voice coil motor 23".

At the timing of t=50 (Sa), the acceleration drive current $I_{VCM\_A}$ reaches the maximum value $I_{AccMAx}$, which is the saturation point, and after t=50 (Sa), the acceleration drive current $I_{VCM\_A}$ is affected by the back electromotive voltage $V_{BEMF}$ and gradually decreases under the influence thereof.

FIG. 6 shows a result obtained by calculating the inductance voltage $V_L$ when the acceleration drive current $I_{VCM\_A}$ shown in FIG. 5 flows by the above-provided calculation: $V_L=L\ (dI_{VCM}/dt)$. Here, since a non-magnetic material is used as the actuator 20 to which the coil 23c of the voice coil motor 23 is attached, the variation of the inductance component L due to temperature change is assumed to be negligibly small.

In the time range of t=0 to 50 (Sa) shown in FIG. 6, the inductance voltage $V_L$ is in a state of transient response.

FIG. 7 shows a part of the change of the acceleration drive current $I_{VCM\_A}$ shown in FIG. 5 with its time axis expanded. In other words, the coil resistance R increases as the coil temperature T increases, and therefore it can be seen how the acceleration drive current $I_{VCM\_A}$ becomes smaller as the coil temperature T increases.

As can be understood from the above-provided expression $V_L=L\ (dI_{VCM}/dt)$, the inductance voltage $V_L$ becomes a larger value as the change per time of the acceleration drive current $I_{VCM\_A}$ is larger.

FIG. 8 shows a part of the change in inductance voltage $V_L$ shown in FIG. 6 with its time axis expanded. To explain, it can be seen that the current flowing into the acceleration drive current $I_{VCM\_A}$ decreases as the coil resistance R increases, meaning that as the temperature increases, the inductance voltage $V_L$ decreases accordingly.

Figures 9, 10:
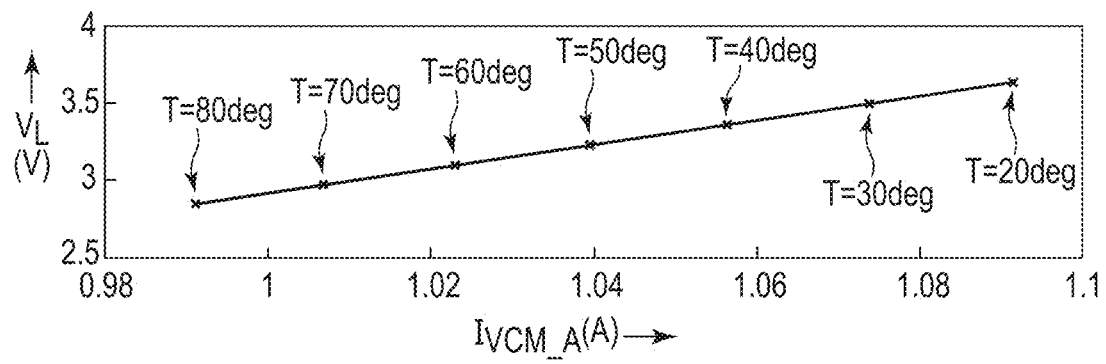
FIG. 9 is a diagram showing a relationship between the drive current for acceleration shown in FIG. 7 and the voltage shown in FIG. 8.
FIG. 10 is a diagram showing a format of a conversion table between the drive current for acceleration in one embodiment and the inductance voltage shown in FIG. 3.

FIG. 9 shows the relationship between the acceleration drive current $I_{VCM\_A}$ at a given timing indicated in FIG. 7 and the inductance voltage $V_L$ at the same timing in FIG. 8. Since the precondition is that a constant drive voltage $V_{VCM}$ is applied to the voice coil motor 23 as described above, the change in the acceleration drive current $I_{VCM\_A}$ on the horizontal axis of FIG. 9 is caused by the change in coil temperature T (that is, the change in coil resistance R). As can be seen from FIG. 9, there is a linearity in the relationship between the acceleration drive current $I_{VCM\_A}$ and the inductance voltage $V_L$. Here, when a constant drive voltage $V_{VCM}$ is applied to the voice coil motor 23, it is possible with this linearity to estimate the inductance voltage $V_L$ from the acceleration drive current $I_{VCM\_A}$ without using the above-provided calculation of $V_L=L\ (dI_{VCM}/dt)$, even if the inductance voltage $V_L$ is in the state of a transient response.

<Operation During Manufacturing of the Magnetic Disk Device 1>

In the process of manufacturing the magnetic disk device 1, the operator sequentially records the drive current $I_{VCM}$ (the acceleration drive current $I_{VCM\_A}$ at arbitrary multiple times t during the acceleration of seek while executing the seek of the magnetic head 10 in at least two or more environmental temperatures. The operator then calculates the inductance voltage $V_L$ corresponding to the acceleration drive current $I_{VCM\_A}$ in each case by plugging the inductance component L of the voice coil motor 23 and each of the above recorded acceleration drive currents $I_{VCM\_A}$ to the theoretical formula of $V_L=L\ (dI_{VCM}/dt)$ provided above. The inductance component L used in this arithmetic operation may be a common value for all the magnetic disk devices 1 to be manufactured, or it may be a unique value for each one of the magnetic disk devices 1. Moreover, the values of these inductance components L may be design values or measured values.

Then, the operator generates a conversion table 45*a* that stores each of the recorded acceleration drive currents $I_{VCM\_A}$ and each of the inductance voltages $V_L$ obtained as described above for the respective acceleration drive currents $I_{VCM\_A}$ while associating them with each other, and stores the table in the above-described flash ROM 45.

In the conversion table 45*a*, data I1, I2, . . . , In are stored sequentially as the values of the respective acceleration drive currents $I_{VCM\_A}$, and data V1, V2, . . . , Vn are stored as the values of the inductance voltages $V_L$ corresponding to the data I1, I2, . . . . In, respectively.

<Control of the Controller 30>

Figure 11:
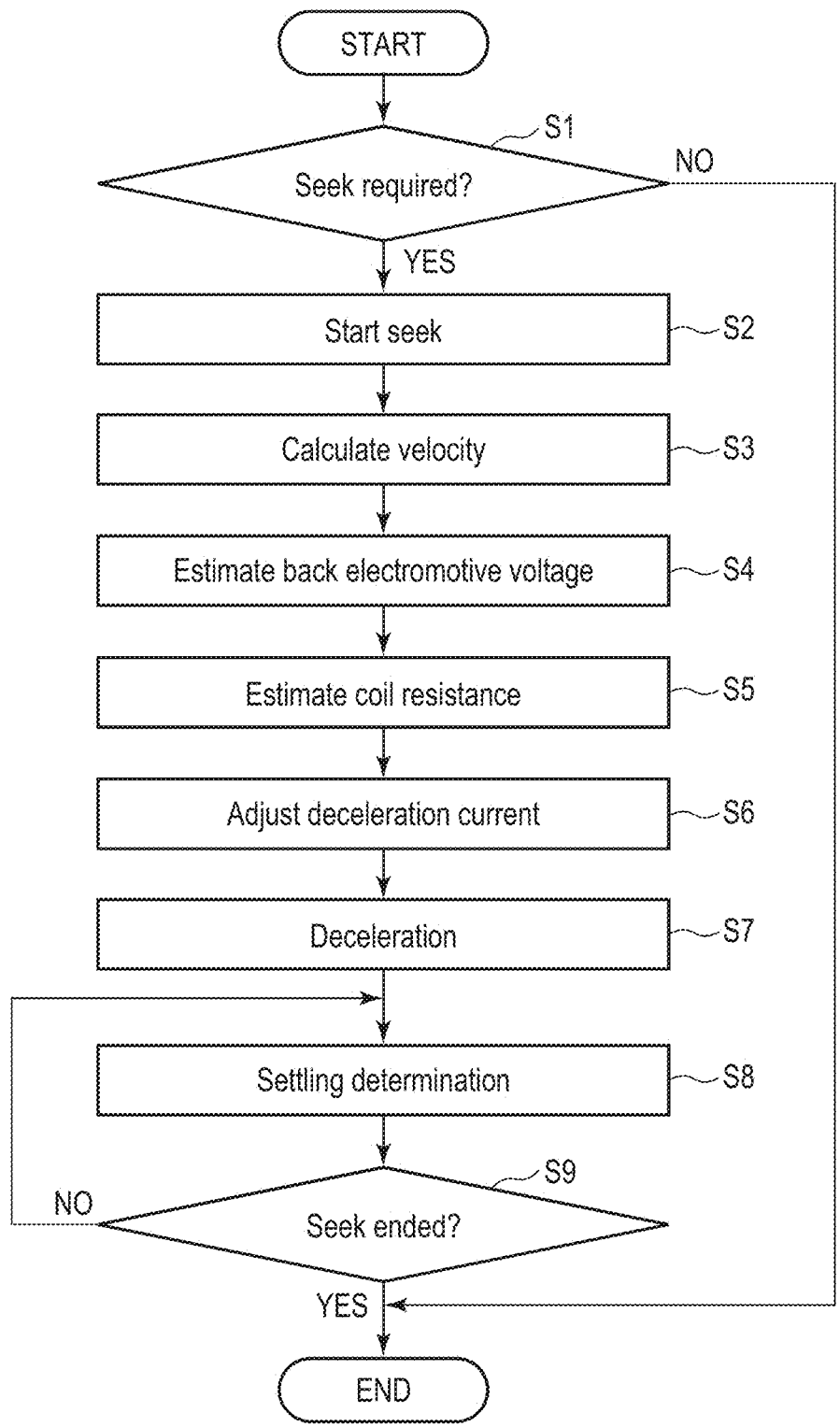
FIG. 11 is a flowchart illustrating the control in one embodiment.

The control executed by the controller 30 during the product use phase after the manufacture of the magnetic disk device 1 will now be explained with reference to the flowchart shown in FIG. 11.

When it is required to seek the magnetic head 10 (S1), the controller 30 starts the seek (S2) of moving the magnetic head 10 from the current position on the magnetic disk 2 to the target position Pt. As the seek operation starts, the controller 30 calculates the velocity (movement velocity) of the magnetic head 10 based on the history of the captured position Pos obtained by the position detection section 30*a* (S3). Then, the controller 30 estimates the back electromotive voltage $V_{BEMF}$ to be induced in the coil of the voice coil motor 23 by the product of the calculated velocity and the above-discussed BL factor $k_{BL}$ (S4).

The controller 30 then obtains the inductance voltage $V_L$ by referring to the conversion table 45*a* based on the acceleration drive current $I_{VCM\_A}$ detected by the current detector 43*a*. Further, based on the inductance voltage $V_L$ thus obtained, the drive voltage $V_{VCM}$ of the voice coil motor 23 detected by the voltage detector 43*b*, the above-estimated back electromotive voltage $V_{BEMF}$, and the acceleration drive current $I_{VCM\_A}$ detected by the current detector 43*a*, the arithmetic operation is carried out using the formula provided below, and thus the resistance R of the coil 23*c* of the voice coil motor 23 is estimated (S5).

$$R=(|V_{VCM}|-|V_L|-|V_{BEMF}|)/|I_{VCM\_A}|$$

Upon referring to the conversion table 45*a*, when the acceleration drive current $I_{VCM\_A}$ detected by the current detector 43*a* is the same as I1, the controller 30 reads out the inductance voltage $V_L$=V1 corresponding to this I1 from the conversion table 45*a*. When the acceleration drive current $I_{VCM\_A}$ detected by the current detector 43*a* is the same as I2, the controller 30 reads the inductance voltage $V_L$=V2 corresponding to this I2 from the conversion table 45*a*. If the acceleration drive current $I_{VCM\_A}$ detected by the current detector 43*a* is the same as I3, the controller 30 reads the inductance voltage $V_L$=V3 corresponding to this I3 from the conversion table 45*a*.

In the case where the acceleration drive current $I_{VCM\_A}$ detected by the current detector 43*a* is "I1+ix" that exists between I1 and I2, the inductance voltage $V_L$=V1 corresponding to I1 and the inductance voltage $V_L$=V2 corresponding to I2 are read from the conversion table 45*a*, and the inductance voltage $V_L$="V1+vx" located between the two read-out inductance voltages $V_L$ is obtained by calculation. Similarly, in the case where the acceleration drive current $I_{VCM\_A}$ detected by the current detector 43*a* is "I2+ix", which is located between I2 and I3, the inductance voltage $V_L$=V2 corresponding to I2 and the inductance voltage $V_L$=V3 corresponding to I3 are read out from the conversion table 45*a*, and the inductance voltage $V_L$="V2+vx" located between the two inductance voltages $V_L$ is obtained by the arithmetic operation.

After the above-described estimation of the coil resistance R, the controller 30 adjusts the deceleration drive current $I_{VCM\_D}$ based on the estimation result (S6).

Figure 12:
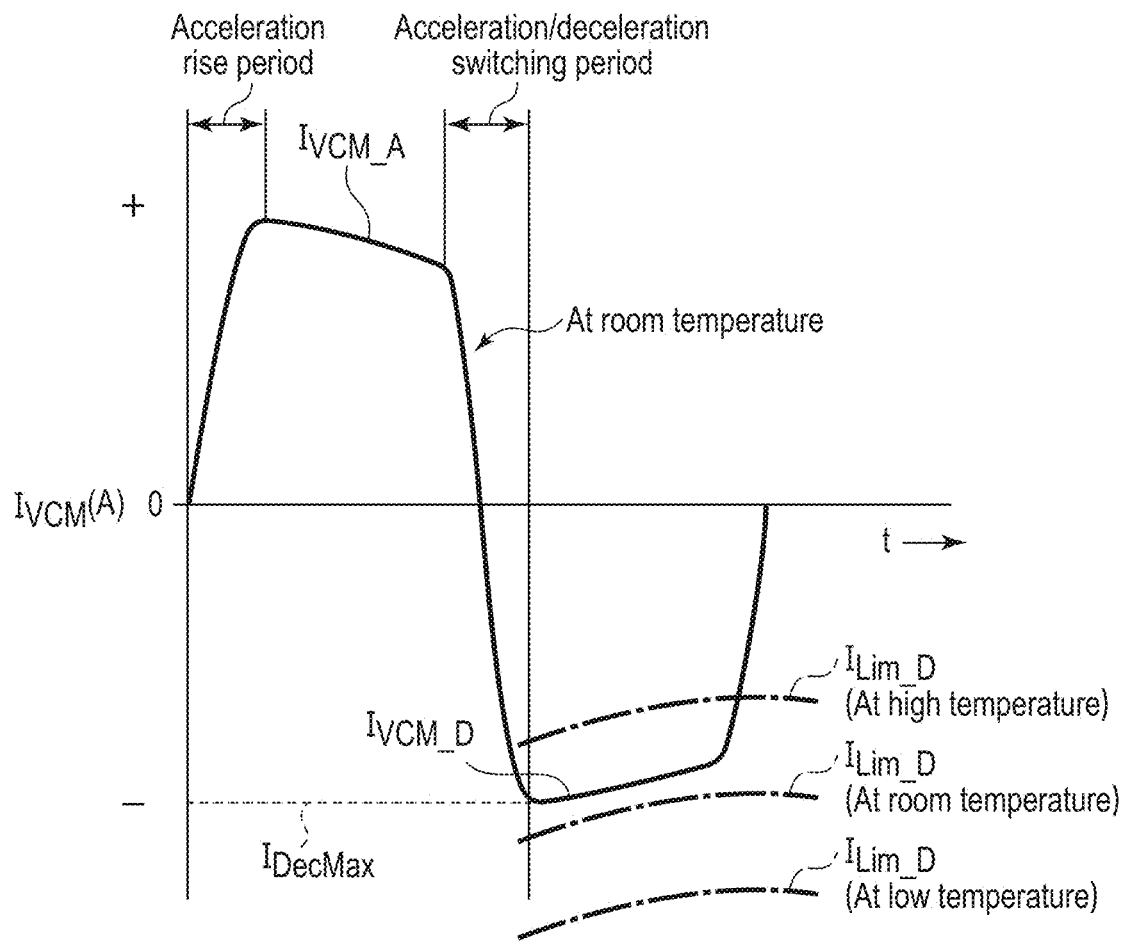
FIG. 12 is a diagram showing the limit value of drive current for deceleration of the voice coil motor in one embodiment.

FIG. 12 shows the deceleration drive current $I_{VCM\_D}$ when the environmental temperature (coil temperature T) is at room temperature, and further three limit values $I_{Lim\_D}$ at timings when the environmental temperature (coil temperature T) is at high, room, and low temperatures, respectively. Here, it is assumed that the magnetic disk device is designed under the normal (room) temperature environment, and the deceleration drive current $I_{VCM\_D}$ shown in FIG. 12 is the standard current at the time of the designing. As shown in FIG. 12, $I_{VCM\_D}$ is designed such that it does not exceed the limit value $I_{Lim\_D}$ at the room temperature even if $I_{VCM\_D}$ takes its maximum value $I_{DecMax}$. The limit value $I_{Lim\_D}$ can be theoretically obtained by the formula provided below. Note that the inductance voltage $V_L$ is different from the value estimated during acceleration.

$$I_{Lim\_D}=(|V_{VCM}|-|V_L|-|V_{BEMF}|)/R$$

From the above-provided formula, it is clear that the limit value $I_{Lim\_D}$ is inversely proportional to the coil resistance R, that is, the coil temperature T. By the designing, it is guaranteed that the maximum value $I_{DecMax}$ of the deceleration drive current $I_{VCM\_D}$ does not become higher than or equal to the limit value $I_{Lim\_D}$ at room temperature. Therefore, by fluctuating the maximum value $I_{DecMax}$ of the deceleration drive current $I_{VCM\_D}$ according to the coil resistance R, $I_{DecMax}$ can be set to follow the limit value $I_{Lim\_D}$, which can change with the fluctuation of the coil temperature T. The maximum value $I_{DecMax}$ of the deceleration drive current $I_{VCM\_D}$ changed according to the coil resistance R is referred to as and represented by $I_{DecMaxM}$.

$$I_{DecMaxM}=I_{DecMax}\times(1/R)$$

As described above, by estimating the coil resistance R, the maximum value $I_{DecMax}$ of the deceleration drive current $I_{VCM\_D}$ can be set as high as possible within its limit value $I_{Lim\_D}$ even when the distance of the seek is short, as shown in FIG. 13. In other words, the current margin $I_{Mgn}$, which is the difference between the maximum value $I_{DecMax}$ and the limit value $I_{Lim\_D}$, can be significantly reduced compared to that of the conventional case (dashed line). In this manner, the deceleration of seek can be increased as much as possible within the range where the deceleration drive current $I_{VCM\_D}$ does not saturate. In other words, the access performance during seek deceleration is improved (achieving a higher performance).

The controller 30 executes the deceleration of seek (S7) and also shifts to the determination of settling (S8). In the settling determination, the controller 30 determines that the magnetic head 10 has reached the target position Pt when a certain period of time (settling period) elapses while the capture position Pos of the position detection section 30*a* is contained within the specified range which interposes the target position Pt in between. The controller 30 captures this determination result as the end of seek (YES in S9) and terminates the seek.

Note that the above-described embodiment is configured such that the inductance voltage $V_L$ is obtained by referring to the conversion table 45*a* based on the acceleration drive current $I_{VCM\_A}$ detected by the current detector 43*a*. The inductance voltage $V_L$ may as well be obtained by fitting the acceleration drive current $I_{VCM\_A}$ detected by the current detector 43a into $I_{VCM}$ of the above-provided formula: $V_L$=L $(dI_{VCM}/dt)$ and differentiating it. In this case, the generation of the conversion table 45a in the process of manufacturing the magnetic disk device 1 is no longer required.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
a magnetic disk;
a magnetic head which performs write and read of data to and from the magnetic disk;
a voice coil motor including a magnet and a coil, which moves the magnetic head in a radial direction of the magnetic disk; and
a controller which controls rotation of the magnetic disk and the movement of the magnetic head;
wherein
the controller includes:
a seek control section which controls a drive current of the voice coil motor to execute a seek operation by moving the magnetic head from a current position to a target position on the magnetic disk, in a manner including acceleration and deceleration;
a velocity calculation section which calculates a velocity of the magnetic head during the seek operation;
a back electromotive voltage estimation section which estimates a back electromotive voltage induced in the coil of the voice coil motor based on the velocity calculated in the velocity calculation section and the position of the magnetic head during acceleration of the seek operation; and
a coil resistance estimation section which obtains an inductance voltage induced in a inductance component of the coil of the voice coil motor during the acceleration of the seek operation and estimates a resistance of the coil of the voice coil motor based on the obtained inductance voltage, a drive voltage of the voice coil motor, the drive current of the voice coil motor, and the back electromotive voltage estimated by the back electromotive voltage estimation section.

2. The device of claim 1, wherein
the controller further includes:
a deceleration current adjustment section which adjusts a drive current for deceleration of the voice coil motor during deceleration of the seek operation based on the resistance estimated by the coil resistance estimation section.

3. The device of claim 1, further comprising:
a current detection section which detects a drive current for acceleration, which is a drive current of the voice coil motor during acceleration of the seek operation; and
a voltage detection section which detects the drive voltage of the voice coil motor;

wherein
the coil resistance estimation section, during the acceleration of the seek operation, obtains the inductance voltage, represented by $V_L$, generated in the inductance component, represented by L, of the voice coil motor from the drive current for acceleration, represented by $I_{VCM\_A}$, detected by the current detection section, and estimates a resistance component, represented by R, of the coil of the voice coil motor by calculation of a formula provided below, based on the obtained inductance voltage $V_L$, the drive voltage, represented by $V_{VCM}$, detected by the voltage detection section, the back electromotive voltage, represented by $V_{BEMF}$, estimated by the back electromotive voltage estimation section, and the drive current for acceleration, represented by $I_{VCM\_A}$ detected by the current detection section:

$$R=(|V_{VCM}|-|V_L|-|V_{BEMF}|)/|I_{VCM\_A}|.$$

4. The device of claim 3, further comprising:
a conversion table which stores a plurality of acceleration drive currents $I_{VCM\_A}$ and a plurality of inductance voltages $V_L$ each generated for a respective one of the acceleration drive currents $I_{VCM\_A}$ during the acceleration of the seek operation while associating these with each other;
wherein
the coil resistance estimation section obtains the inductance voltage $V_L$ corresponding to the drive current for acceleration $I_{VCM\_A}$ detected by the current detection section by reference to the conversion table.

5. The device of claim 4, wherein
each of the acceleration drive current $I_{VCM\_A}$ stored in the conversion table is an acceleration drive current $I_{VCM\_A}$ that is successively recorded during rise of the acceleration of a plurality of seek operations executed in at least two or more environmental temperatures; and
each of the inductance voltages $V_L$ stored in the conversion table is obtained by an operation of fitting the inductance component L of the voice coil motor and each of the recorded acceleration drive currents $I_{VCM\_A}$ into a following formula:

$$V_L=L(dI_{VCM\_A}/dt).$$

6. The device of claim 3, wherein
each of the inductance voltages $V_L$ is obtained by fitting the inductance component L of the voice coil motor and each respective one of the recorded acceleration drive currents $I_{VCM\_A}$ into a following formula:

$$V_L=L(dI_{VCM\_A}/dt).$$

7. The device of claim 1, wherein
the controller includes:
a position detection section which detects a position of the magnetic head on the magnetic disk based on the read data of the magnetic head.

8. The device of claim 7, wherein
the velocity calculation section calculates the velocity of the magnetic head during the seek operation by performing a differential calculation of a detected position determined by the position detection section.

9. The device of claim 7, wherein
the back electromotive voltage estimation section estimates the back electromotive voltage by a product of the velocity calculated by the velocity calculation section and a BL factor according to the detected position determined by the position detection section.

10. A method of controlling a magnetic disk device comprising a magnetic disk; a magnetic head which performs write and read of data to and from the magnetic disk; a voice coil motor including a magnet and a coil, which moves the magnetic head in a radial direction of the magnetic disk; and a controller which controls rotation of the magnetic disk and the movement of the magnetic head, the method comprising:

carrying out a seek operation of the magnetic head from a current position to a target position on the magnetic disk, including acceleration and deceleration, by controlling a drive current of the voice coil motor;

calculating a velocity of the magnetic head during the seek operation, estimating, during the acceleration of the seek operation, a back electromotive voltage induced in the coil of the voice coil motor based on the calculated velocity and the position of the magnetic head; and obtaining an inductance voltage generated in an inductance component of the coil of the voice coil motor during the acceleration of the seek operation from a drive current of the voice coil motor, and estimating a resistance of the voice coil motor based on the obtained inductance voltage, the drive voltage of the voice coil motor, the drive current of the voice coil motor, and the estimated back electromotive voltage.

* * * * *